(12) United States Patent  
Lopez

(10) Patent No.: US 11,364,945 B2  
(45) Date of Patent: Jun. 21, 2022

(54) MANUAL CASH CASSETTE TROLLEY

(71) Applicant: TBFORTE SEGURANÇA E TRANSPORTE DE VALORES LTDA, São Paulo (BR)

(72) Inventor: Edson Igor Cifuentes Lopez, São Paulo (BR)

(73) Assignee: TBFORTE SEGURANCA E TRANSPORTE DE VALORES LTDA, Sao Paulo (BR)

( * ) Notice: Subject to any disclaimer, the term of this patent is extended or adjusted under 35 U.S.C. 154(b) by 34 days.

(21) Appl. No.: 17/105,055

(22) Filed: Nov. 25, 2020

(65) Prior Publication Data

US 2021/0197880 A1 Jul. 1, 2021

(30) Foreign Application Priority Data

Nov. 27, 2019 (BR) .......................... 102019024980-3

(51) Int. Cl.
*B62B 3/10* (2006.01)
(52) U.S. Cl.
CPC ............ *B62B 3/10* (2013.01); *B62B 2202/12* (2013.01)
(58) Field of Classification Search
CPC ............................... B62B 3/10; B62B 2202/12
See application file for complete search history.

(56) References Cited

U.S. PATENT DOCUMENTS

| 6,223,691 | B1 * | 5/2001 | Beattie | A45C 13/385 |
| | | | | 119/479 |
| 6,550,792 | B1 * | 4/2003 | Salmon | B65F 1/006 |
| | | | | 248/129 |
| 2007/0102893 | A1 * | 5/2007 | Mayo | B62B 3/10 |
| | | | | 280/79.11 |
| 2012/0049474 | A1 * | 3/2012 | Del Rosario | B62B 1/008 |
| | | | | 248/304 |
| 2017/0129518 | A1 * | 5/2017 | Huisman | B62B 1/125 |
| 2019/0217878 | A1 * | 7/2019 | Duru | B62B 3/022 |
| 2021/0261180 | A1 * | 8/2021 | Ceja | B62B 3/10 |

FOREIGN PATENT DOCUMENTS

| DE | 102020214749 A1 * | 5/2021 | ............... B62B 3/10 |
| WO | WO-2016132120 A1 * | 8/2016 | ............... B60P 3/03 |

* cited by examiner

*Primary Examiner* — Bryan A Evans
(74) *Attorney, Agent, or Firm* — Morgan, Lewis & Bockius LLP

(57) ABSTRACT

The invention relates to a new manual cash cassette trolley (1), which is driven manually by the employee/security guard, said manual trolley (1) having a formal structure that greatly facilitates the displacement of the cash cassette, overcoming obstacles that usually cause inconvenience and demand physical strength and attention from the user who handles the cassette container boxes; said manual cash cassette trolley (1) having stoppers (7), spindles (4) on the internal faces of the extensions (6) and a smaller caster (5a) on each of its external faces; among the larger casters (5) positioned inferiorly and the smaller casters (5a) positioned centrally or intermediately, the other portion (2a) of said structure is positioned horizontally and orthogonal to the main vertical portion (2), which is "U" shaped and receives bilateral plates (8); the horizontal portion (2a) of the structure also receives bilateral tubular elements (9) in the form of right triangles; and the external and shorter section (10) of said horizontal portion (2a) of said structure of said cash manual trolley (1) features a handle element (11).

1 Claim, 6 Drawing Sheets

MANUAL CASH CASSETTE TROLLEY

FIELD OF APPLICATION

This Invention Patent specification describes more particularly a new manual cash cassette trolley, which is driven manually by the user, said manual trolley having a formal structure that greatly facilitates the displacement of said cash cassettes, overcoming obstacles that usually cause inconvenience and demand physical strength and attention from the user who handles the cassette container box, said manual cash cassette trolley belonging more particularly to the field of manual trolleys with wheels for transportation of cash cassettes.

PREAMBLE

This Invention Patent application refers to a manual trolley for cassette container boxes having a substantially simplified formal structure, said manual trolley providing the user, usually an employee of a cash-in-transit company, with greater comfort, ease and safe conveyance of the cash cassettes from the armored car to the self-service terminals, where the cassettes will be placed, promoting a faster and more efficient procedure and minimizing eventual occurrences.

STATE OF THE ART

As it is well known, banking institutions have been offering their customers a series of benefits, such as self-service terminals, which are external self-service facilities where several types of operations can be performed, one of the main ones being the withdrawal and deposit of values.

Such values, intended to supply the ATMs, are transported by security safekeeping companies, which in turn use armored cars for their transportation.

When arriving at their destination, the employee of the cash-in-transit company removes from the armored car one or more cassette transport boxes, usually used to hold the cassettes with sufficient cash for self-service terminals.

Said cassette transport boxes are moved manually from the armored car by the employee of the cash-in-transit company or bank to the self-service terminal, in order to exchange the cassettes.

Problems of the State of the Art

It happens that each equipment uses five cassettes, 4 cassettes with a mass around 5 kg each and 1 cassette with a mass of 0.800 kg. While being taken out from the armored car, the cassettes are placed in a plastic box called "unit" with a mass around 5.3 kg, so the total mass to be moved by the employee to make a supply is up to 26.1 kg.

In order to supply the self-service terminal, the employee (security guard) of the company or bank goes down the steps of the armored car lifting the 26.10 kg load and goes towards the ATM to replace the cassettes and, after supplying, the employee/security guard returns and climbs back the armored car with a certain load. This procedure of getting on and off the armored car with a certain load requires effort from the employee/security guard, which can cause health problems.

A solution that could be adopted to overcome this inconvenience would be the use of manual cargo vehicles, such as the well-known cargo trolleys.

Just for the sake of example, the Brazilian Patent and Trademark Office—INPI foresees in its patent bank a document that reveals a trolley that could be used, although with some difficulties, for the transportation of cassettes to supply the ATMs, which is the document MU 7700028-5, filed on Jan. 9, 1997 and entitled "DISPOSIÇÃO CONSTRUTIVA EM TRANSPORTADOR MANUAL [CONSTRUCTIVE ARRANGEMENT IN MANUAL TROLLEY]", said manual trolley being defined by a vertical structure comprising vertical lateral, central and horizontal rods, a lower crosspiece from which a pair of frontal projections protrudes and a pair of posterior rods where its two wheels are fixed, an upper movable frame connected by tape to the traction device and, further, comprising handles.

Said solution was not developed to facilitate the transport of the cassettes from the inside of the armored car to the exact location where the cassettes will be positioned, requiring effort from the employee/security guard to place the cassette boxes into the manual trolley and move it to the self-service terminals.

In this case, the employee/security guard will need to manually move the cassette boxes to the manual trolley and bring the manual trolley to the self-service terminals for replacement.

The manual removal of the boxes with the cassettes from the armored car occurs as said armored cars have steps from their internal surface to the ground.

Many health problems can occur with the employee/security guard when it is necessary to manually move the cassette boxes to the manual trolley.

BRIEF DESCRIPTION OF THE INVENTION

Thinking on these inconveniences and interested in providing improvements to the consumer market, the inventor created and developed this "MANUAL CASH CASSETTE TROLLEY", which should prominently stands out among its counterparts and becomes unique before the consumer market as it features a manual trolley that eliminates the need for the employee/security guard to get on and off the armored car with the load of cassettes in their arms.

Said manual cash trolley generally presents two portions of tubular structure, the main one vertical and the other one horizontal, the latter supporting the cassettes, establishing an assembly orthogonal to each other, said assembly provided with 06 (six) casters, two of them being the main ones and having a larger diameter and the others having a smaller diameter, and also provides a handle and a pair of lower supports called spacers.

This particular manual cash cassette trolley has 06 (six) casters that allow the manual trolley to slide on the internal floor of the armored car, and the platform where the load is positioned is displaced to promote the least effort when placing the manual trolley in the armored car.

The handle was developed with the intrinsic purpose of assisting in lifting the load of cassettes, and the structure plates of the manual cash cassette trolley are designed to reinforce the assembly, the tubular connecting elements or caster spindles, defined to allow the rotation of the casters, the stoppers to contain each of the casters and, finally, the support spacer tubes of the assembly.

The cassettes are positioned on the base defined by the horizontal orthogonal portion, and the employee/security guard pulls the manual trolley along the upper spindle, just like a conventional trolley.

When the trolley arrives at the armored car, it abuts its first entrance step and, when pushing the cart against the step, the stopper will rest on that step.

Subsequently, the manual trolley is lifted by the handle and the upper wheels touch the floor of the armored car and thus continue to lift until the trolley is positioned parallel to the floor, pushing it until the central or intermediate casters touch the floor.

In this condition, the employee/security guard will not need to make any more effort to lift the load and, thus, can climb on the armored car more comfortably.

Finally, this cash cassette trolley allows postural repositioning of the employee/security guard, avoiding muscle and spine disorders and others injuries resulting from the old need to lift very heavy objects; by greatly reducing the load to be lifted, it prevents the employee/security guard from going up or down the steps of the armored car while lifting weight.

BRIEF DESCRIPTION OF THE DRAWINGS

The subject matter of this Invention will be fully clear in its technical aspects from the detailed description made based on the figures listed below, in which.

DETAILED DESCRIPTION OF THE INVENTION

Figure 1:
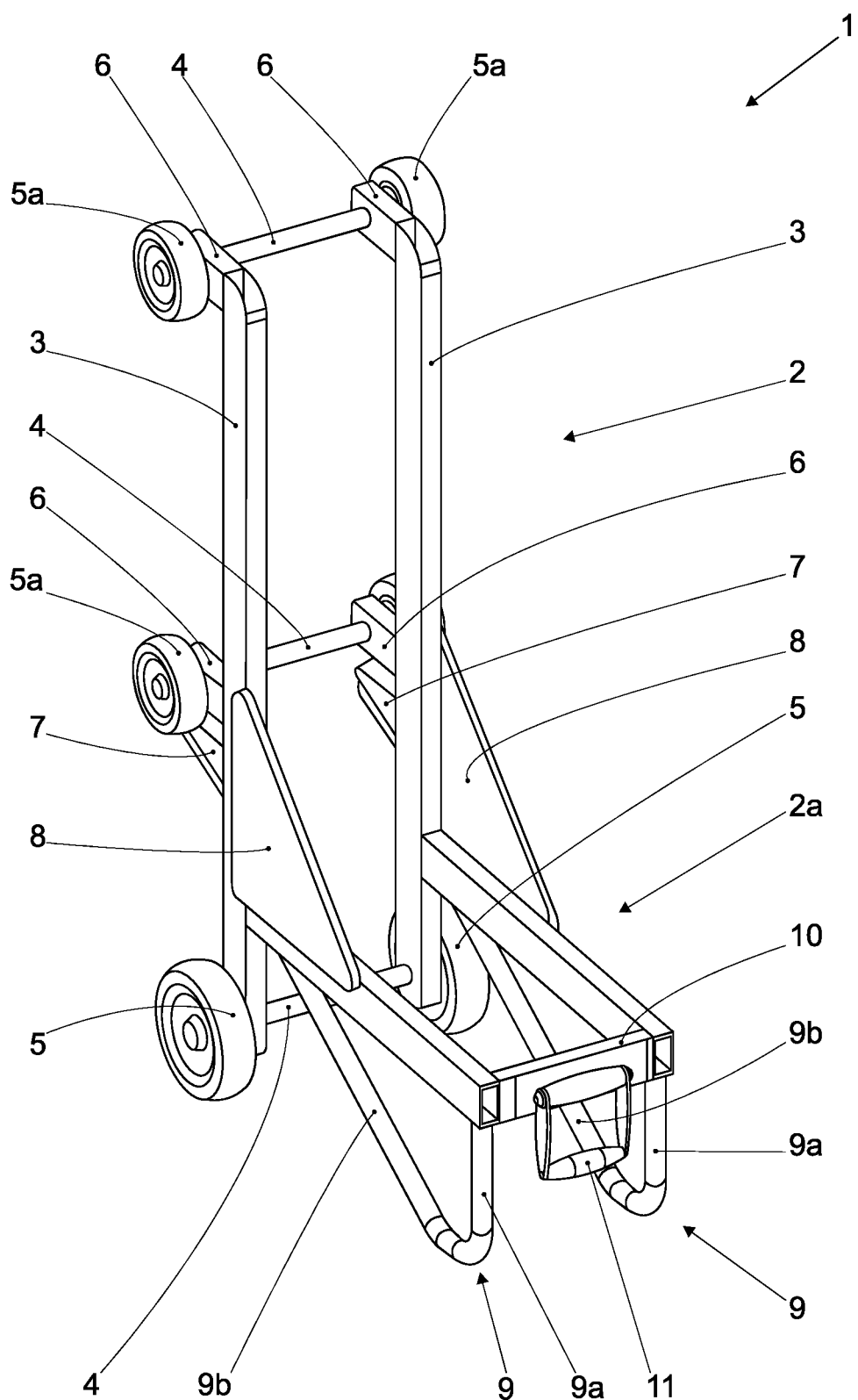
FIG. 1 shows a perspective view of the cash cassette trolley.
Figure 2:
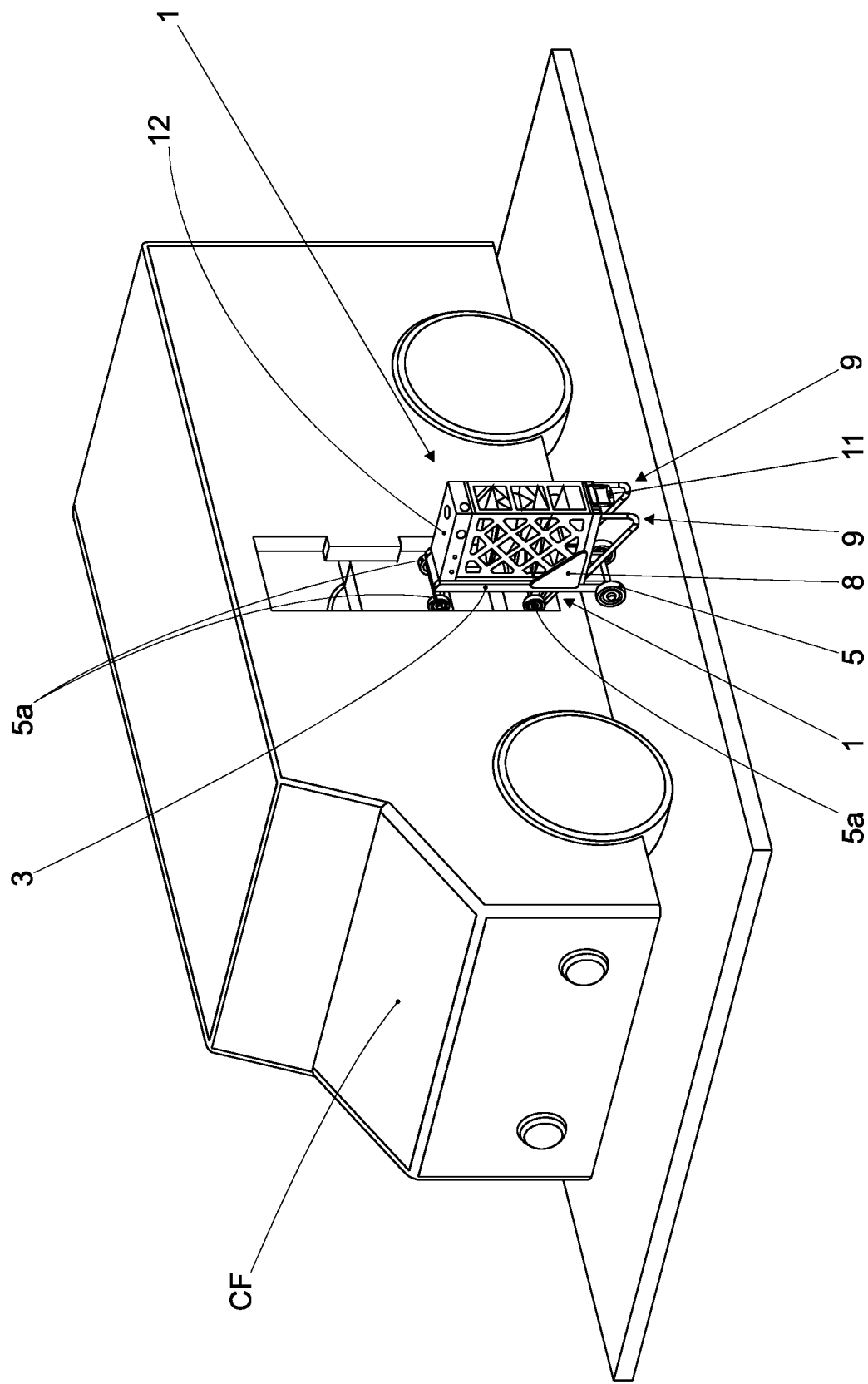
FIG. 2 shows a perspective view, schematically illustrating the armored car with the cash cassette trolley facing the side door of said armored car.
Figure 3:
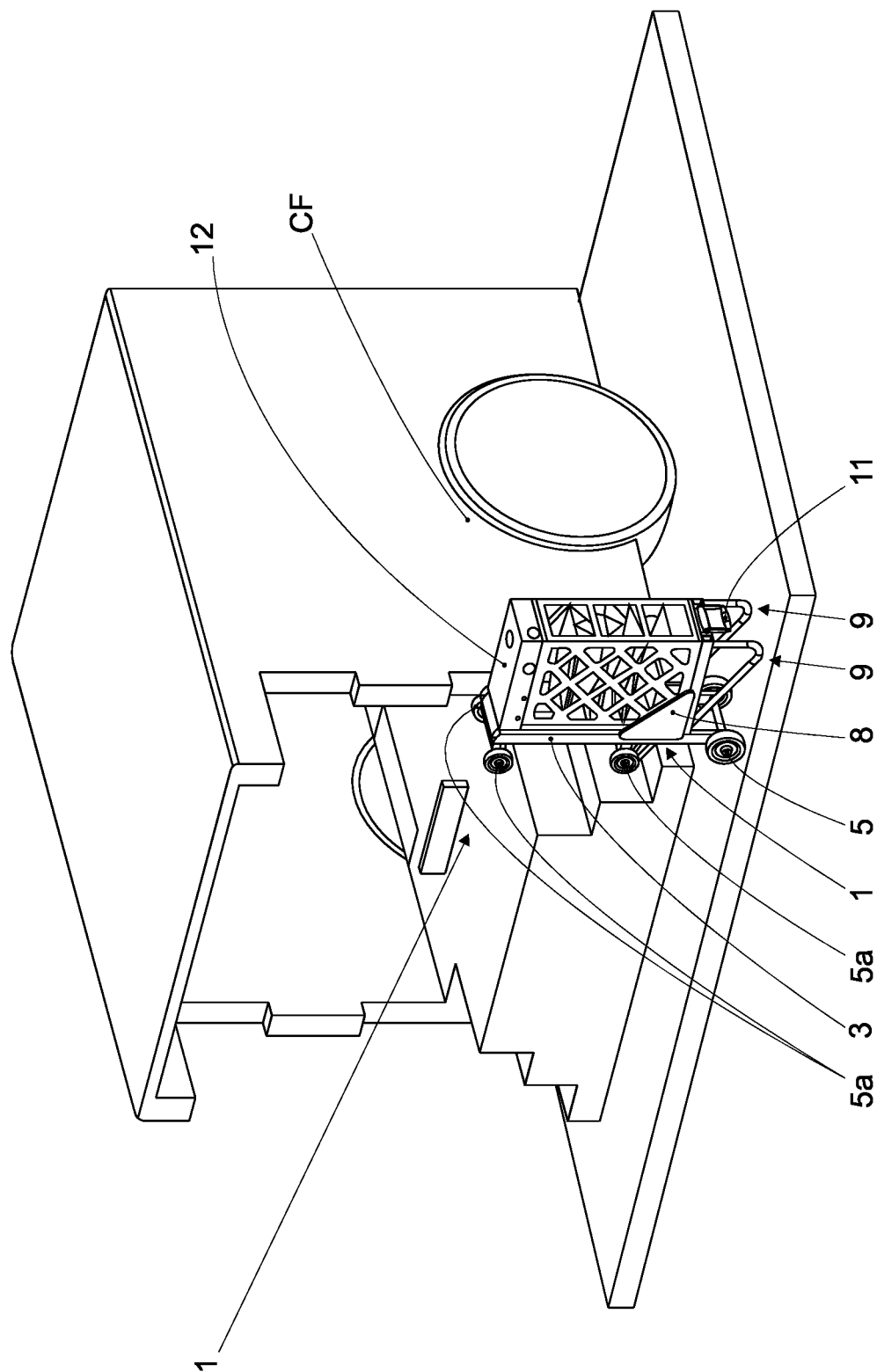
FIGS. 3, 4, 5 and 6 show perspective views of the armored car, schematically and sectionally illustrating the manual trolley with the cash cassettes in different positions, showing the movements of the manual trolley in said armored car.
Figure 4:
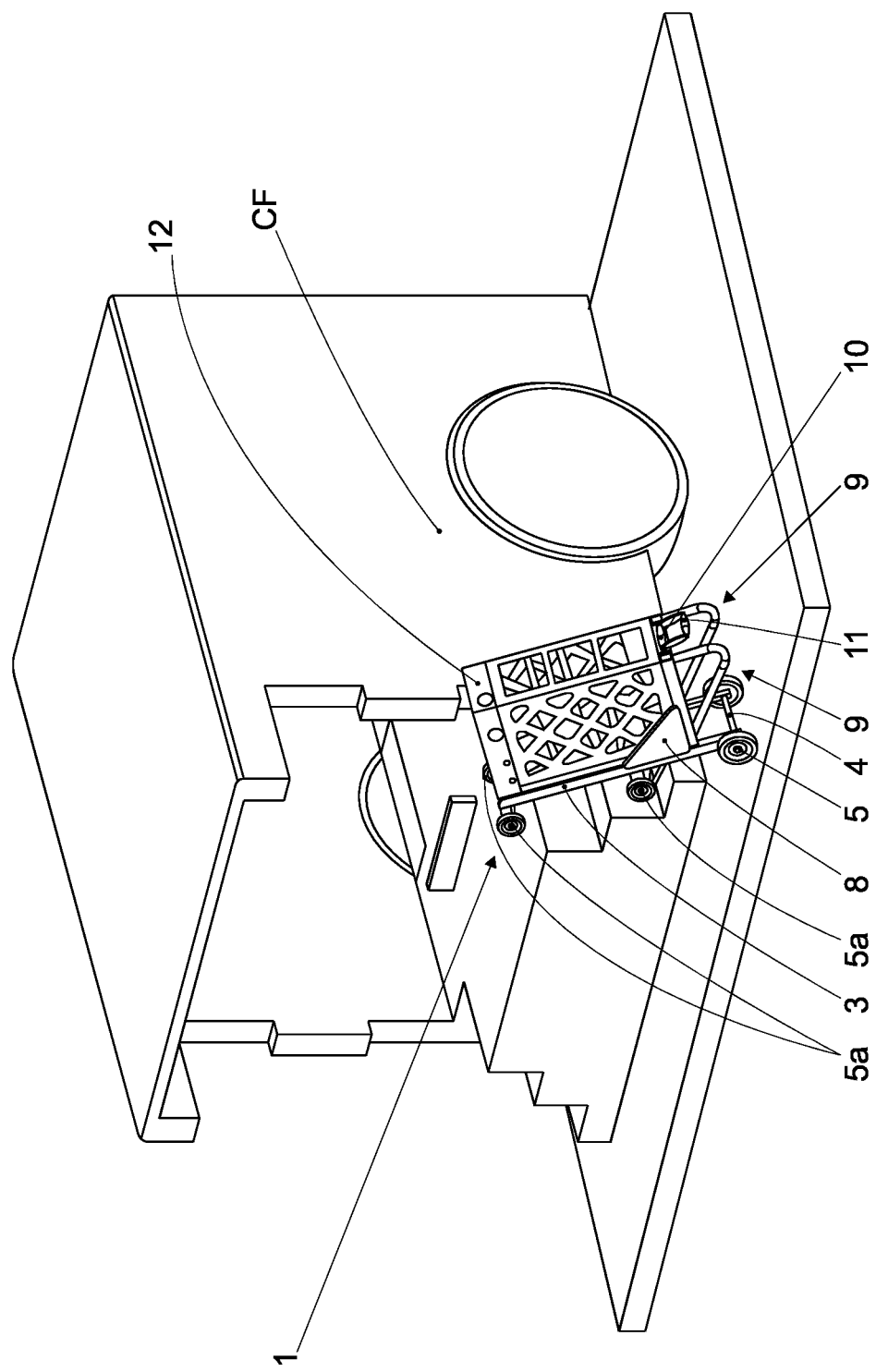
Figure 5:
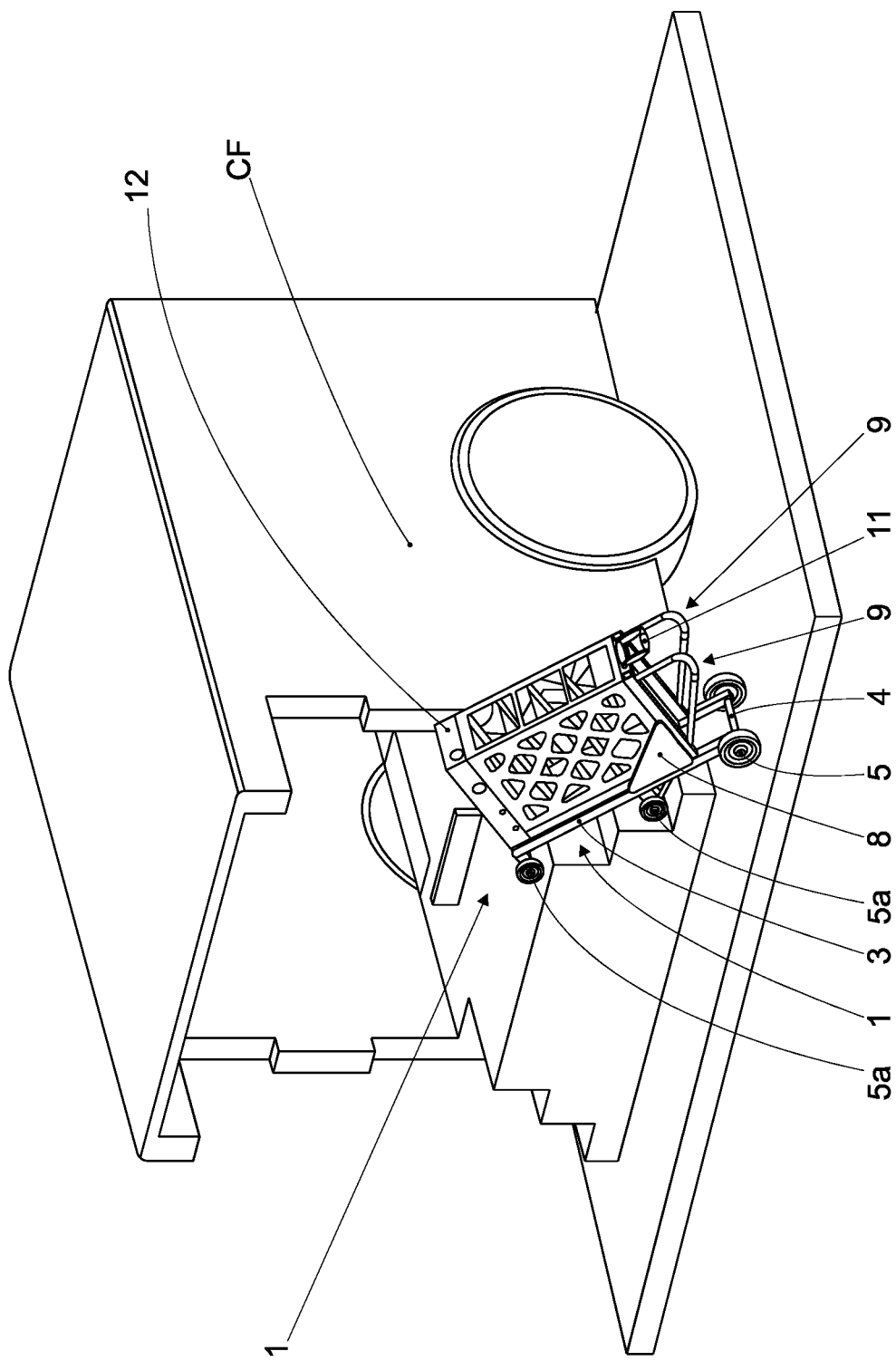
Figure 6:
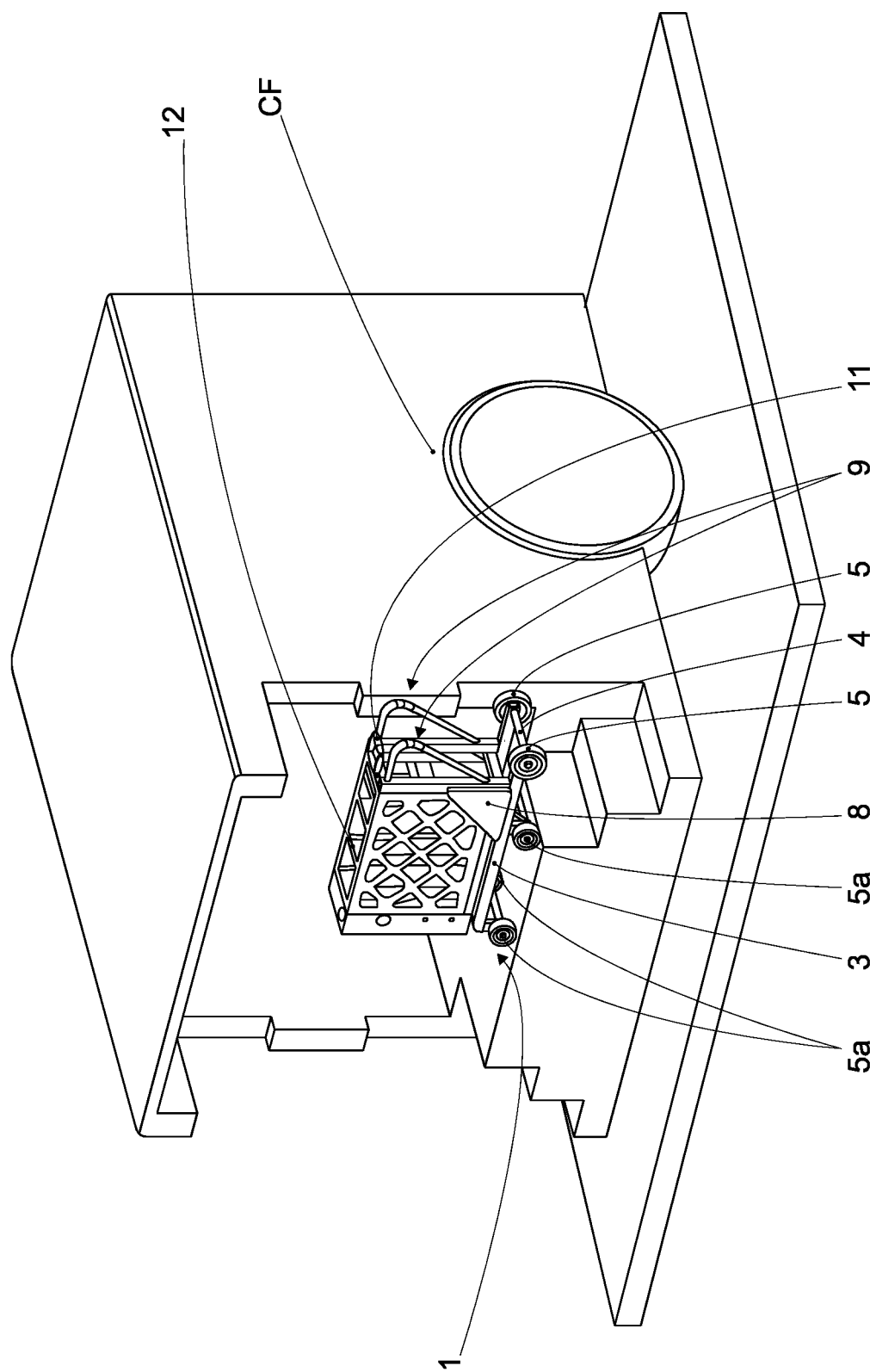

According to what illustrate the above-mentioned figures, this invention patent, "MANUAL CASH CASSETTE TROLLEY", is defined by a manual trolley 1 developed from a tubular structure, which is divided into two portions orthogonal to each other, with a main vertical portion 2 and a base horizontal portion 2a, wherein said main vertical portion 2 is composed of two vertical tubular elements 3 equidistant and positioned parallel to each other, wherein said tubular elements 3 present, in their lower ends, a single tubular connecting element or spindle 4, which is bilaterally faced by larger casters 5.

Both tubular elements 3 of the main vertical portion 2 have small orthogonal 6 and posterior extensions, in addition to stoppers 7, the extensions positioned in the central and extreme portions of said tubular elements 6 and the stoppers 7 positioned in the central portion only.

The small extensions 6 receive each a tubular connecting element or spindle 4 in its internal faces and a smaller castor 5a in each of its external faces.

Among the larger casters 5 positioned inferiorly and the smaller casters 5a positioned centrally or intermediately, the other portion 2a of this structure is positioned horizontally and orthogonal to the main vertical portion 2.

This horizontal portion 2a of the trolley 1 has a "U" shape and receives bilateral plates 8 of connection reinforcement of said trolley 1.

Furthermore, said horizontal portion 2a of the structure also receives bilateral tubular elements 9 in the form of right triangles, i.e., each of these bilateral tubular elements has an extreme section 9a orthogonal to the horizontal structure, extending diagonally 9b until the point the main vertical portions 2 of the structure meet the horizontal portion 2a.

Finally, the external and shorter section 10 of said horizontal portion 2a of the structure of the manual cash cassette trolley (1) presents a handle element 11, which facilitates the movement of the manual cash cassette trolley (1).

Usually, cash is arranged on cassettes and each group of said cassettes is packed in a box made of thermoplastic material, called "unit" 12.

At first, the "unit" 12 is filled with the cassettes full of cash and the employee manually packs the "unit" 12 on the manual cash cassette trolley 1, which is moved by the employee/security guard of the company up to the armored car CF.

When arriving at the side door of the armored car CF to pack the "units" 12, the casters 5 and 5a are positioned as follows: first, the larger casters 5 move the trolley 1 to the side door of the armored car. Then, the intermediate casters 5a are positioned aligned in the mirror of the second step and, when manually tilted into said armored car, the smaller intermediate casters 5a touch the floor of the first step, while the smaller and extreme casters 5a rest on the floor of the third step, or on the internal floor of the armored car.

At this moment, when both pairs of smaller casters 5a rest on the surfaces of the armored car, the employee/security guard raises the trolley 1 through its handle 11, positioning said trolley 1, thus removing the larger casters 5 from the floor.

Finally, it is enough for said employee/security guard to push the trolley 1 into the armored car CF, positioning it properly for transportation.

When arriving at the place where the self-service terminals are located, the employee/security guard pulls, through the handle 11, the manual cash cassette trolley 1, so that it tilts until the larger casters 5 touch the floor and said employee/security guard can move the trolley 1 with the "units" 12 having the cassettes to the self-service terminals in order to supply each one of them.

Although the invention is detailed herein, it is important to understand that its embodiments are not limited to the details and steps described herein. The invention is capable of other embodiments and can be made or performed in a variety of ways. It should be understood that the terminology used herein is for the purpose of description and not limitation.

The invention claimed is:

1. A MANUAL CASH CASSETTE TROLLEY comprising a metallic tubular structure divided into two orthogonal portions, having a main vertical portion (2) and a base horizontal portion (2a), said main vertical portion (2) consisting of two tubular elements (3) equidistant and positioned parallel to each other, said tubular elements (3) featuring, at their lower ends, a single spindle (4), which is bilaterally faced by larger casters (5); both tubular elements (3) of the main vertical portion (2) having small orthogonal and posterior extensions (6) positioned in the central and distal portions of said tubular elements (3), the structure comprises it features stoppers (7) positioned in the central part, the small extensions (6) each receiving a spindle (4) on its internal faces and a smaller caster (5a) on each of its external faces; between the larger casters (5) and the smaller casters (5a), the horizontally portion (2a) of said structure is positioned horizontally and orthogonal to the main vertical portion (2); the horizontal portion (2a) of the trolley (1) has a "U" shape and comprises bilateral reinforcement plates (8) (1); furthermore, said horizontal portion (2a) of the structure also comprises bilateral tubular elements (9) in the form of right triangles, each of the bilateral tubular elements has a section (9a) orthogonal to the horizontal portion and a section, extending diagonally (9b) until the point where the main vertical portion (2) of the structure meets the horizontal portion (2a); and an external and shorter section (10) of said horizontal portion (2a) of said structure of said manual cash cassette trolley (1) features a handle element (11).

\* \* \* \* \*